United States Patent
Toshima et al.

(10) Patent No.: US 7,491,313 B2
(45) Date of Patent: Feb. 17, 2009

(54) TWO-STEP HYDROPROCESSING METHOD FOR HEAVY HYDROCARBON OIL

(75) Inventors: Hiroshi Toshima, Hilversum (NL); Satoshl Abe, Ehime (JP)

(73) Assignee: ExxonMobil Research and Engineering Company, Annandale, NJ (US)

(*) Notice: Subject to any disclaimer, the term of this patent is extended or adjusted under 35 U.S.C. 154(b) by 344 days.

(21) Appl. No.: 11/153,558

(22) Filed: Jun. 14, 2005

(65) Prior Publication Data

US 2006/0011510 A1 Jan. 19, 2006

Related U.S. Application Data

(60) Provisional application No. 60/580,607, filed on Jun. 17, 2004.

(51) Int. Cl.
- *C10G 65/12* (2006.01)
- *C10G 47/00* (2006.01)
- *C10G 45/04* (2006.01)
- *C10G 47/14* (2006.01)
- *C10G 47/12* (2006.01)

(52) U.S. Cl. ............... 208/58; 208/111.3; 208/111.35; 208/216 R; 208/216 PP; 208/217

(58) Field of Classification Search .......... 208/46, 208/49, 58, 60, 67, 69, 70, 106, 108, 109, 208/110, 177, 208 R, 209, 213, 216 R, 243, 208/111.3, 216 PP, 217, 111.35
See application file for complete search history.

(56) References Cited

U.S. PATENT DOCUMENTS

| | | | | |
|---|---|---|---|---|
| 3,925,197 A | | 12/1975 | Van Klinken et al. | 208/216 |
| 4,498,972 A | | 2/1985 | Toulhoat et al. | 208/59 |
| 5,236,692 A | * | 8/1993 | Nagashima et al. | 423/584 |
| 5,496,532 A | * | 3/1996 | Monzen et al. | 502/325 |
| 7,011,807 B2 | * | 3/2006 | Zhou et al. | 423/584 |
| 7,045,479 B2 | * | 5/2006 | Zhou et al. | 502/325 |
| 7,070,757 B2 | * | 7/2006 | Fischer et al. | 502/325 |
| 2004/0018143 A1 | * | 1/2004 | Zhou et al. | 502/325 |
| 2004/0138059 A1 | | 7/2004 | Euzen et al. | 502/255 |

FOREIGN PATENT DOCUMENTS

| | | |
|---|---|---|
| JP | 6-53875 | 7/1994 |
| JP | 8-325580 | 12/1996 |
| JP | 2001/205084 | 7/2001 |
| WO | 02/100985 | 12/2002 |
| WO | WO 02100985 A2 * | 12/2002 |

OTHER PUBLICATIONS

Van Kerkvoort, W.J., et al., "Determination of Dry-Sludge Content of Fuel Oils: Development of the Shell Hot Filtration Test (SHFT)," *J. Ins. Pet.*, 37, pp. 596-604, 1951.

* cited by examiner

*Primary Examiner*—Glenn Caldarola
*Assistant Examiner*—Randy Boyer
(74) *Attorney, Agent, or Firm*—W. Robinson H. Clark; Gerald J. Hughes

(57) ABSTRACT

A method is disclosed for hydroprocessing a heavy hydrocarbon oil, comprising a first hydroprocessing step of bringing a heavy hydrocarbon oil into contact with a Catalyst (1) with a certain specific surface area and pore size distribution in the presence of hydrogen in a first reaction zone containing the Catalyst (1), and a second hydroprocessing step of bringing the hydroprocessed oil obtained from the first reaction zone into contact with a Catalyst (2) with a certain specific surface area and pore size distribution in the presence of hydrogen in a second reaction zone containing the Catalyst (2). The method is an improvement in decreasing or inhibiting the sediment formation, while highly hydroprocessing a heavy hydrocarbon oil containing a large amount of impurities such as sulfur, micro carbon residue (MCR), metals, nitrogen and asphaltene, especially a heavy oil containing a large amount of heavy vacuum residue, to adequately remove the impurities.

11 Claims, No Drawings

TWO-STEP HYDROPROCESSING METHOD FOR HEAVY HYDROCARBON OIL

CROSS-REFERENCE TO RELATED APPLICATION

This application claims benefit of U.S. Provisional Patent Application Ser. No. 60/580,607 dated Jun. 17, 2004.

FIELD OF THE INVENTION

The invention relates to a method of hydroprocessing a heavy hydrocarbon oil. More particularly, the invention relates to a method of using a combination of independently selected catalysts for the processing of heavy oils such as vacuum resid.

BACKGROUND OF THE INVENTION

An atmospheric resid ("AR") is a heavy oil that contains about 30 wt. % or more of species having an atmospheric boiling point of about 540° C. and higher. Vacuum resid ("VR") is a heavy oil that contains about 60 wt. % or more of such species. Such heavy oils can be hydroprocessed in order to remove impurities such as sulfur, for conversion into a valuable light oil. Generally, hydroprocessing is used to remove micro carbon residue ("MCR"), sulfur, various metals, nitrogen, and asphaltene.

Asphaltene is an aggregate of condensed aromatic species, which are dissolved or suspended in the heavy oil. In the event that asphaltene is cracked excessively during hydroprocessing, cohesion of the cracked fragments occurs to form granular species, e.g., sludge and/or sediment.

Sediment is a deposit which can be measured by testing a sample according to the Shell Hot Filtration Solid Test (SHFST) (see van Kerkvoort et al., *J. Ins. Pet.*, 37 pages 596-604 (1951)). Sediment generally comprises species having an atmospheric boiling point of about 340° C. or more, and when collected from flash drum bottoms in a refining process, comprise about 0.19 to about 1 wt. %, based on the weight of the bottoms. Sediment can settle, during oil refining, in equipment such as heat exchangers, reactors and downstream filters, and undesirably restrict flow.

Especially in the hydroprocessing of a heavy oil containing a large amount of vacuum resid, sediment would be formed in even greater abundance and, therefore, it would be desirable to improve the hydroprocessing catalyst and hydroprocessing methods to achieve the desired level of impurity removal while keeping the formation of sediment as low as possible.

It is known (i.e., conventional) in the hydroprocessing of heavy hydrocarbons that if catalysts having different functions are used in combination, they can exhibit improved performance over that exhibited by individual catalysts. When a combination of independently selected catalysts having specific pore sizes is used in a two-stage hydroconversion process, a vacuum resid containing heavier fractions can be highly hydroprocessed to produce a light oil with an economically high added-value, while the generation of sediment is suppressed.

Accordingly, conventional heavy oil processing generally comprises two catalytic steps. In the first step, a catalyst with activity for cracking asphaltene and, optionally, for removing metals is used to decrease the asphaltene content to inhibit the formation of sediment. A second step (final step) uses a catalyst having a high desulfurization activity to hydrodesulfurize the product of the first step to produce a desulfurized oil.

For example, JP 7-65055B, ("'055", Gazette), discloses a hydroprocessing method for converting the heavy portion of hydrocarbon oil containing sulfur impurities and metallic impurities at least in two steps. This technology relates to a hydroprocessing method using a catalyst containing about 0.1 to about 5 wt. % of a metal oxide for hydrodemetallization in the first step and using a hydrodesulfurization catalyst containing about 7 to about 30 wt. % of a metal oxide in the subsequent second step. In case of this method, it is said to be beneficial that demetallization and hydrocracking are carried out in the first step and that the resid is processed by desulfurization in the second step. The reference discloses a combination of catalysts where the first step catalyst has a "sea urchin" structure and the second step catalyst has an alumina-cohering state. However, because the amount of the catalyst used in the first step is small, the desulfurization and hydrogenation functions decline though the demetallization function required in the first step is improved. Therefore, in the second step, since a high desulfurization function is needed, a greater amount of catalyst is used compared to the first step. Since a high desulfurization function is necessary in the second step, a higher temperature is used which leads to a higher cracking rate and, consequently, asphaltene is precipitated.

Patent application JP 8-325580A, ("'580", Gazette), discloses a catalytic hydroconversion method for a heavy feedstock. The '550 reference discloses a method using a first step catalyst, in which a carrier material selected from alumina, silica and a combination thereof is loaded with a total of about 2 to about 25 wt. % of oxides of active metals selected from cadmium, chromium, cobalt, iron, molybdenum, nickel, tin, tungsten, and combinations thereof. Reaction conditions in the first step include a reaction temperature of about 438 to about 468° C., a hydrogen partial pressure of about 105 to about 245 kg/cm$^2$, and a space velocity of about 0.3 to about 1.0 (Vf/hr/Vr). A similar catalyst is used in the second step, where reaction conditions include a reaction temperature of about 371° C. to about 427° C., a hydrogen partial pressure of about 105 to about 245 kg/cm$^2$, and a space velocity of 0.1 to 0.8 (Vf/hr/Vr).

The '580 patent application discloses an improved catalytic hydroconversion method (i.e., H-Oil™, available from AXENS) for a heavy hydrocarbon upgrading. The improvement addresses the efficient use of catalysts, the product quality, and the management of unreactive residue by means of re-circulation. The '580 patent discloses a higher reaction temperature and lower catalyst activity in the first step, and a lower reaction temperature and higher catalyst activity in the second step. Disadvantageously, the high temperature reaction of the first step leads to the thermal condensation of asphaltene and molecular fragments such as petroleum. Such asphaltene and resins can lead to undesirable coking of the second-stage catalyst. Moreover, according to the '580 disclosure, the second-stage catalyst is not well suited for preventing the cohesion and precipitation of asphaltene formed in the second step.

Patent application JP 6-53875B, ("'875", Gazette), is also directed towards a multi-step, catalytic heavy hydrocarbon conversion method. In the first step, a fixed bed or an ebullated bed reactor is operated at a reaction temperature of about 415 to about 455° C., a hydrogen partial-pressure of about 70 to about 211 kg/cm$^2$, and a space velocity of about 0.2 to about 2.0 (Vf/hr/Vr). In the second step, an ebullated bed reactor is used at a reaction temperature of about 415 to about 455° C., a hydrogen partial pressure of about 70 to about 211 kg/cm$^2$, and a space velocity of about 0.2 to about 2.0 (Vf/hr/Vr). The catalyst support contains alumina, silica, and mixtures thereof. An oxide of a catalytically active metal selected from cadmium, chromium, cobalt, iron, molybdenum, nickel, tin, tungsten, and mixtures thereof, is present on the support.

The '875 patent discloses the recirculation of vacuum bottoms to achieve a high cracking rate, without regard to asphaltene cohesion. detrimental to high cracking rate operation is disclosed. The aim of the first stage is catalytic demetallization, not the prevention of asphaltene precipitation.

Therefore, there is a need in the art for a heavy hydrocarbon hydroconversion process that inhibits the formation of sediment detrimental to operation in the hydrocracking of heavy oil while achieving sufficient levels of desulfurization and cracking.

There is also a need for an effective hydroprocessing method using a combination of catalysts for the hydroprocessing of a heavy hydrocarbon oil containing a large amount of impurities such as sulfur, micro carbon residue ("MCR"), metals, nitrogen, and asphaltene.

There is also a need for a hydroconversion process with improved asphaltene cracking, and a combination of catalysts, which enables production of highly desulfurized oil while decreasing the sediment formation with an increase of conversion rate.

SUMMARY OF THE INVENTION

In an embodiment, the invention relates to a two-step, heavy oil catalytic hydrocracking method. A first catalyst having a specific pore size distribution is used in the first reaction step (or stage or zone) to decrease the impurities in the heavy hydrocarbon oil. Demetallization and efficient asphaltene removal in the first step are effective for preventing the precipitation of asphaltene. An independently selected second catalyst having a catalyst composition and pore size distribution different from the first catalyst of the first reaction zone is used in the second reaction step (or stage or zone) for achieving a greater degree of desulfurization and hydrogenation while inhibiting the sediment formed due to the precipitation of the asphaltene.

The invention is based in part on the discovery that (i) when a catalyst with a specific pore size distribution is used in the first reaction zone, and (ii) when a catalyst having a catalyst composition and pore-size distribution different from the catalyst used in the first reaction zone is used in the second reaction zone, then the catalyst combination allows for more stable operation or the process with reduced asphaltene precipitation. Moreover, using the independently selected catalysts in the first and second zones leads to a greater degree of desulfurization and hydrogenation in the process, with less sediment formation.

More particularly, in a two-step heavy hydrocarbon oil upgrading process, a catalyst with a specific pore size distribution is supplied in the first reaction zone to efficiently crack the asphaltene in the heavy hydrocarbon oil feed. Without this cracking, the asphaltene would form sediment. In addition to asphaltene cracking, moderate feed hydrogenation occurs in the first stage. Effluent from the first stage is then conducted to a second reaction step where a catalyst with a catalyst composition and pore size distribution intended for improving desulfurization performance is used for both desulfurization of the oil and for inhibiting the formation of sediment. The high removal of asphaltene in the first reaction stage allows a greater amount of sulfur removal in the second reaction stage and inhibits the unwanted generation of coke deposited on the catalyst, which would otherwise lead to a decline in catalyst performance.

In one embodiment, there is provided a method of hydroprocessing a heavy hydrocarbon oil, comprising:

a first hydroprocessing step of bringing a heavy hydrocarbon oil into contact with a first catalyst ("Catalyst (1)") in the presence of hydrogen in a first reaction zone of a hydroprocessing apparatus, and a second hydroprocessing step of bringing hydroprocessed oil obtained in said first reaction zone into contact with a second, independently selected catalyst ("Catalyst (2)") in the presence of hydrogen in a second reaction zone.

Catalyst (1) is a hydroprocessing catalyst in which a porous inorganic carrier (also called a "support") is loaded with about 7 to about 20 wt. % of the oxide of a Group VI(b) metal of the Periodic Table and about 0.5 to about 6 wt. % of the oxide of a Group VIII metal of the Periodic Table of the Elements (Sargent-Welch Scientific Company, No. S-18806, 1968; the "Periodic Table") respectively, based on the weight of the catalyst; said catalyst having (a) a specific surface area of about 100 to about 180 $m^2/g$, (b) a total pore volume of about 0.55 ml/g or more, and (c) a pore size distribution wherein (i) the proportion of the volume of the pores having diameters of about 200 Å and more is 50% or more based on the total pore volume, and (ii) the proportion of the volume of the pores having diameters of about 2000 Å and more is about 10 to 30%, based on the total pore volume. The pore size distribution is determined by a method such as mercury penetration.

Catalyst (2) is a hydroprocessing catalyst having a silica-alumina type carrier (or support) such as those where a silica layer is formed on an alumina surface. The support contains about 2 to about 40 wt. % of silica based on the total weight of the carrier. The support is loaded with about 7 to about 20 wt. % of the oxide of a Group VI(b) metal of the Periodic Table, and about 0.5 to about 6 wt % of the oxide of a Group VIII metal of the Periodic Table, respectively based on the weight of the catalyst. The catalyst has a specific surface area of about 150 to about 400 $m^2/g$, and a total pore volume of about 0.3 to about 1.2 ml/g. The pore size distribution as measured by a method such as mercury penetration is such that the catalyst has a first peak of the pore size distribution in a range of a diameter of about 40 Å to about 200 Å with the proportion of about 35% to about 90% of a total pore volume, and a second peak of said pore size distribution in a range of a diameter of about 200 Å to about 2000 Å. The catalyst contains pores of diameter of about 200 Å to about 1000 Å, which comprise about 10% to about 60% of said total pore volume and pores of diameters about 1000 Å or larger, which comprise a volume of about 20% or less of said total pore volume; and a pore volume in a pore diameter range of about ±20 Å corresponding to the position of the first peak in the diameter range of about 40 Å to about 200 Å is 50% or more of the pore volume in the diameter range of about 40 Å to about 200 Å. The catalyst has a mean pore diameter of about 70 Å to about 180 Å.

In an embodiment, the hydroprocessing is carried out at a temperature of about 350° C. to about 450° C. at a pressure of about 5 to about 25 MPa in the first and second reaction zones, and that the heavy hydrocarbon oil disposed as an ebullated bed is brought into contact with the hydroprocessing catalyst.

In an embodiment, the feed to the first step is an atmospheric residue (AR) containing about 30 wt. % or more and/or a vacuum residue (VR) containing about 60 wt. % or more of the components having a boiling point of, for example, about 538° C. and higher. Such feeds are frequently called heavy hydrocarbon oils.

DETAILED DESCRIPTION OF THE INVENTION

In an embodiment, the invention is directed towards a two-stage process for the catalytic processing of heavy oils such as vacuum resid. The first and second-stage catalysts are independently selected.

More particularly, the invention relates to a method of hydroprocessing a heavy hydrocarbon oil containing impurities such as sulfur, metals, and asphaltene. Feed hydrodesulfurization ("HDS"), feed hydrodemetallization ("HDM"), and asphaltene removal from the feed is accomplished while inhibiting sediment formation in heat exchangers during hydrogenation. The process efficiently produces a light oil product.

The process is effective for the hydroprocessing of a heavy hydrocarbon oil containing a large amount of impurities such as sulfur, MCR, metals, nitrogen and asphaltene, especially a heavy oil containing about 80% or more of vacuum resid fractions, while inhibiting sediment formation resulting from, e.g., the cohesion of asphaltenes.

First and Second Reaction Zone Catalysts

The hydroprocessing catalyst used in the first reaction zone (i.e., Catalyst (1)) and the hydroprocessing catalyst used in the second reaction zone (i.e., Catalyst (2)) are catalytic compositions comprising metal oxides having hydrogenation and/or hydrocracking activity and a carrier (also called a "support") loaded with the catalytic composition.

The metal species used in the catalytic composition are selected from one or more oxides of a Group VI(b) metal and/or one or more oxides of a Group VIII metal of the Periodic Table.

Group VI(b) and Group VIII also correspond respectively to Group 6 and Groups 8 through 10 of the 18-group long form of the IUPAC Periodic Table (see, e.g., the "MERCK INDEX, S. Budavari (ed.); Merck & Co., Inc., 1966).

The Group VIII metal is at least one selected from iron, cobalt and nickel. Cobalt or nickel is preferable; nickel is more preferable. The Group VI(b) metal is at least one selected from chromium, molybdenum and tungsten. Molybdenum is preferred.

The loaded amounts of the respective metal oxides based on the weight of each completed catalyst (100 wt. %) are as described below.

The amount of the Group VI(b) metal oxide loaded on Catalyst (1) is about 7 wt. % to about 20 wt. %, preferably about 8 wt. % to about 16 wt. %. For Catalyst (2), the amount of the Group VI(b) metal oxide loaded in the Catalyst (2) is about 5 wt. % to about 30 wt. %, preferably about 8 wt. % to about 25 wt. %. It has been discovered that for Catalyst (1) and Catalyst (2), these metal loadings represent the best balance between catalytic activity and sediment formation.

The amount of the Group VIII metal oxide typically loaded on the support of Catalyst (1) is about 0.5 wt. % to about 6 wt. %, preferably about 1 wt. % to 5 about wt. %. For Catalyst (2), the amount of Group VIII metal oxide loaded is about 0.5 wt. % to about 30 wt. %, preferably about 1 wt. % to about 10 wt. %. These metal loadings represent the best balance between catalytic activity and sediment formation of Catalyst (1) and Catalyst (2).

The carriers (also known to those skilled in the art as "supports") used in the catalysts are described below.

Catalyst (1) is supported on a porous inorganic oxide carrier which generally comprises one or more of alumina, silica, silica-alumina, alumina with silica-alumina dispersed therein, silica-coated alumina, magnesia, zirconia, boria, and titania, as well as mixtures of these oxides. It is preferred for the carrier to comprise about 80% of alumina, more preferably at least about 90%, still more preferably at least about 95%. A carrier consisting essentially of alumina is preferred, the wording "consisting essentially of" being intended to mean that minor amounts of other components may be present, so long as they do not materially affect the performance of the catalyst. Typically, porous alumina produced by means of co-precipitation of sodium aluminate and aluminum sulfate can be used. The gel (pseudo-boehmite) obtained in this case is dried, extruded and calcined to obtain an alumina carrier.

The carrier of Catalyst (2) is preferably supported on a silica-alumina carrier containing about 20 wt. % to about 40 wt. % of silica. As is known, the silica-alumina can be obtained by controlling conditions and operations in a method where silica hydrate gel and alumina hydrate gel prepared in advance. The gels are combined and a basic or acidic species is added to the homogeneously mixed solution containing water-soluble aluminum compound and water-soluble silicon compound to allow co-precipitation of these compounds. In an embodiment, an alumina hydrate gel is formed, and then a silica hydrate gel is precipitated on the alumina hydrate gel.

Silica dispersion on alumina is measured by observing a bonding condition between silica and alumina by a $^{29}$Si-NMR measuring method described, for example, in Japanese Patent Publication No. H2-237640.

Catalyst (1) and Catalyst (2) can be prepared as follows.

First, an alkali solution of sodium aluminate, ammonium hydroxide, sodium hydroxide or the like is placed in a vessel containing tap water (which is optionally heated), and then an acidic aluminum solution of aluminum sulfate, aluminum nitrate or the like is added to the water.

Alkali metal silicate, tetraalkoxyl silane, orthosilicic ester, etc., can be used as the silica source to produce a carrier of a Catalyst (2). It is preferable to use sodium silicate (for example water glass), as alkali metal silicate, in which mol ratio of $Na_2O$ to $SiO_2$ is within a range of about 1 to 2 to about 1 to 4.

The hydrogen ion concentration (pH) of the mixed solution changes with the progression of reaction. It is preferable that when the addition of the acidic aluminum solution is completed, the pH is 7 to 9, and that the mixing temperature is about 70° C. to about 85° C. for Catalyst (1) and about 55° C. to about 70° C. for Catalyst (2). It is preferable that the retention time is about 0.5 to about 1.5 hours, more preferably about 40 to about 80 minutes, in order to obtain the desired alumina hydrate gel or silica-alumina gel.

After the alumina hydrate gel or silica-alumina gel is separated from the solution, it is washed, for example, by conventional tap water (optionally heated), to remove impurities in the gel.

The gel is then kneaded using, for example, a kneading machine, to improve the moldability of the gel, and then extruded into a desired form using an extruding machine. It is preferable to extrude into a desired form before loading with metal components. The particles can have conventional shapes and dimensions, i.e., those known in the art. For example, the particles may be spherical, cylindrical, or polylobal, with a diameter range from about 0.5 mm to about 10 mm. Particles with a diameter of about 0.5 mm to about 3 mm, preferably about 0.7 mm to about 1.2 mm, for example about 0.9 mm to about 1.1 mm, and a length of about 2 mm to about 10 mm, for example about 2.5 mm to about 4.5 mm, are preferred. Cylindrical particles are preferred for use in ebullating bed operations.

Finally, the extruded alumina gel grains or silica-alumina gel grains are dried and calcined. The drying treatment is carried out at room temperature to 200° C. in the presence of air, and the calcination treatment is carried out at 300 to 950° C., preferably 600 to 900° C. for about 30 minutes to 2 hours in the presence of air. During the calcination treatment, water vapor can also be introduced to control the growth of the alumina crystallite or silica-alumina particle.

The above production method can provide the desired alumina carrier or silica-alumina carrier having the desired surface area and a pore size distribution. During kneading and extruding, an acid such as nitric acid, acetic acid or formic acid can be added as a extruding auxiliary, or water can be added to adjust the water content of the alumina gel or silica-alumina gel, for adequately adjusting the pore size distribution.

In an embodiment, the specific surface area of the alumina carrier of the Catalyst (1) is about 100 $m^2/g$ to 200 $m^2/g$, preferably about 130 $m^2/g$ to about 190 $m^2/g$, and the total pore volume is about 0.55 ml/g to 1.2 ml/g, preferably 0.7 ml/g to about 1.1 ml/g.

In an embodiment, Catalyst (2), has a specific surface area of the silica-alumina carrier of about 150 $m^2/g$ to about 400 $m^2/g$, preferably about 160 $m^2/g$ to about 370 $m^2/g$, and a total pore volume of about 0.3 ml/g to about 1.2 ml/g, preferably about 0.35 ml/g to about 0.95 ml/g. The silica content in the silica-alumina carrier of the Catalyst (2) is about 2.0 wt. % to about 40.0 wt. %, preferably about 5.0 wt. % to about 25.0 wt. % based on the weight of the carrier substance (100 wt. %).

The following method describes the method for preparing the finished catalyst using supports prepared as described above. The method is applicable to Catalyst (1) and Catalyst (2).

Alkali or acid metallic salts can be used as the metal precursor. Impregnated liquid made of aqueous solution of the metallic salt is loaded to a carrier of Catalyst (1) or Catalyst (2) using a method such as immersion, impregnation, and equilibrium adsorption. For example, a mixed aqueous solution containing two or three metal salts can be simultaneously impregnated into the carrier, or metal salt aqueous solutions can be impregnated sequentially. To stabilize the impregnation solution(s), it is preferable to add a small amount of ammonia water, hydrogen peroxide water, gluconic acid, tartaric acid, citric acid, malic acid or EDTA (ethylenediaminetetraacetic acid), and the like.

For the Group VIII metals, an aqueous metal solution of an oxide, hydroxide, carbonate, nitrate, chloride, and/or an organic acid salt can be used. Metal carbonate and nitrate are preferred. For example, in the case of an aqueous solution of nickel nitrate, an aqueous solution of about 10 wt. % to about 40 wt. % can be used, and preferably, an aqueous solution of about 25 wt. % is used. For the Group VI metals, oxide, ammonium salt, sodium salt, and the like, can be used as a starting material; water-soluble ammonium salt and sodium salt are preferable. For example, in the case of water-soluble ammonium molybdate, an aqueous solution of about 10 wt. % to about 25 wt. % can be used; preferably an aqueous solution of about 15 wt. % is used.

An aqueous solution of metallic salt can be impregnated in a carrier for about 30 to 60 minutes using the above-mentioned aqueous solution, and then the carrier can be dried for about 0.5 hours to about 16 hours at a temperature between ambient temperature and about 200° C. under flowing air. The catalyst can then be calcined at about 200° C. to about 800° C., preferably about 450° C. to about 650° C., for about 1 to 3 hours in flowing air.

For better performance in the process, (Catalyst (1) and Catalyst (2) should have the following desired surface areas and pore size distributions.

The desired surface area of the Catalyst (1) is about 100 $m^2/g$ to about 180 $m^2/g$, preferably about 150 $m^2/g$ to about 170 $m^2/g$. A surface area of greater than about 180 $m^2/g$ can be used, although the higher surface area can increase the hydrogenation activity, which can increase sedimentation.

The desired surface area of the Catalyst (2) is about 150 $m^2/g$ to about 400 $m^2/g$, preferably about 160 $m^2/g$ to about 370 $m^2/g$.

The desired surface area can be measured by a BET method based on the adsorption of nitrogen ($N_2$).

The total pore volume of Catalyst (1) (measured by the method of mercury penetration) is about 0.55 ml/g or more, preferably about 0.6 ml/g to about 1.2 ml/g, more preferably about 0.6 ml/g to about 1.1 ml/g, most preferably about 0.6 ml/g to about 0.9 ml/g. The total pore volume of Catalyst (2) is about 0.3 ml/g to about 1.2 ml/g or more, preferably about 0.35 ml/g to about 0.95 ml/g. The catalytic performance may decrease when the total pore volume is about 0.3 ml/g or less. A total pore volume of about 1.2 ml/g or more can undesirably affect the mechanical strength of the catalyst.

Mercury penetration can be used to measure pore volume using, for example, a mercury porosity measuring instrument such as "Auto Pore II™", produced by Micrometrics, at a contact angle of 140° and at a surface tension of about 480 dyn/cm.

For Catalyst (1), the proportion of the volume of the pores having diameters of about 200 Å and more based on the total pore volume is about 50% or more, preferably about 60% to about 80% (in this specification, symbol Å denotes Angstroms; 1 Å=$10^{-10}$ m). If the proportion of the volume of the pores having diameters of about 200 Å and more is less than about 50% based on the total pore volume, the catalytic performance can decline, especially the asphaltene cracking performance, which adversely affects the inhibition of sediment formation.

For the base support (i.e., not yet loaded with the catalytic metal oxides), the proportion of the total volume of pores is about 43% or more, preferably about 47% to 70%, based on the total pore volume.

In an embodiment for Catalyst (1), the proportion of the volume of the pores having diameters of about 2000 Å and more is about 10% to about 30% based on the total pore volume. If the proportion is less than about 10%, the asphaltene removal performance at the final outlet of the reactor may decline, which can increase sediment formation. If the proportion is more than about 30%, the mechanical strength of the catalyst can be adversely affected. Preferably, the proportion of the volume of the pores having diameters of about 10,000 Å and more is about 0% to about 1% based on the total pore volume.

Especially in the case where the feedstock to be processed contains a large amount of vacuum residue, e.g., more than about 30%, and especially more than about 60%, it is preferable that the proportion of the total volume of the pores having diameters of 100 to 1200 Å of the Catalyst (1) is 82% or less, more preferably 80% or less based on the total pore volume. If the proportion is more than about 82%, the proportion of the total volume of the pores having diameters of about 2000 Å and more can decrease, which leads to insufficient diffusion of extra-heavy fractions into the catalyst pores in the first reaction zone. This in turn can lead to a decline in the vacuum residue fraction cracking rate.

For Catalyst (1), it is preferable that the total volume of the pores having diameters of about 500 to about 1500 Å is less than about 0.2 ml/g. When the total volume of such pores is greater than about 0.2 ml/g, catalytic performance and catalyst lifetime can be adversely affected. It is also preferable that the pore size distribution is such that the proportion of the volume of the pores having diameters of about 100 Å and less is 25% or less based on the total pore volume. A proportion greater than 25% can lead to increased sediment formation.

For Catalyst (2), it is preferred that pore diameter distribution has a first peak in a diameter range of about 40 Å to about 200 Å, the peak representing a pore volume of about 35% to about 90%, preferably about 40% to about 80%, based on the total pore volume. A first peak in a diameter region of 200 Å or larger can lead to reduced activity resulting from a reduction of specific surface area. The first peak (existing in the diameter range of about 40 Å to about 200 Å) can have two or more local maximums, i.e., it need not be unimodal. A pore volume of less than 35% can result in an increase of a large pore region, which can lead to a loss of catalyst mechanical. When the pore volume is more than 90%, catalytic activity can be adversely affected.

In addition to the first peak, the pore diameter distribution for Catalyst (2) can have a second peak in a diameter range of about 200 Å to about 1000 Å, based on the total pore volume, with the proportion of such pore volume ranging from about 10% to about 60%, more preferably about 20% to about 50%, based on the total pore volume. While not wishing to be bound by any theory or model, it is believed that the presence of this second peak in the pore diameter distribution results in the selective hydrocracking of large molecular species such as asphaltenes and resins, which, in turn, results in decreased sediment formation.

For Catalyst (2), the proportion of the pore volume with a pore diameter of about 1000 Å or larger is controlled to be 20% or less, preferably 15% or less, based on the total pore volume. When the proportion of the pore volume with a pore diameter of about 1000 Å or larger exceeds 20%, it becomes difficult to prevent strength deterioration of the catalyst.

As discussed, Catalyst (2) is characteristized by a pore size distribution having a first peak with a peak position in the range of about 40 Å to about 200 Å diameter, with the first peak representing pores that together contain about 35% to about 90% of the total pore volume of the catalyst. Preferably, the pores of the first peak within a diameter range of about i 20 Å from the peak position contain at least about 50% of the pore volume in the diameter range of about 40 to about 200 Å. More preferably, the pores of the first peak within a diameter range of about ±10 Å from the peak position contain at least about 30% of the pore volume in the diameter range of about 40 to about 200 Å.

Such pore characteristics show that the pore volume distribution relating to the first peak in the diameter range of about 40 Å to about 200 Å is such that homogeneous pores exist around the pores having diameters corresponding to the peak position. The half-value width of the first peak is preferably about 70 Å or less, and more preferably about 50 Å or less. When the pore volume in the pore diameter range of about ±20 Å corresponding to the first peak position is significantly less than 50%, an excessive increase of unsuitable diameter pores can result in strength deterioration and generation of ΔP and fouling due to pulverization of the catalyst. When the peak has local maximum values, the pore diameter corresponding to the larger value is used to calculate the pore volume with a pore diameter of about ±20 Å or, preferably, about ±10 Å.

Catalyst (2) should have a mean pore diameter ranging from about 70 Å to about 180 Å, preferably about 75 Å to about 175 Å. A pore diameter of less than about 70 Å can prevent heavy oil from diffusing in the pores of the catalyst, leading to difficulty in hydroprocessing. When the mean pore diameter exceeds 180 Å, an imbalance of pore volumes having the first and second peaks can result, leading to difficulty in achieving the desired level of hydrodesulfurization.

The Hydrogenation Process

The heavy hydrocarbon oils to be hydroprocessed by this invention include heavy distillated oil, petroleum residue, solvent-deasphalted oil, coal-liquefied oil, shale oil, tar sand oil, and the like, typically atmospheric residue (AR), vacuum gas oil (VGO), vacuum residue (VR), and mixtures thereof. Preferably, the feed contains vacuum residue.

In an embodiment, the feed contains an atmospheric residue (AR) containing about 30 wt. % or more and a vacuum residue (VR) containing about 60 wt. % or more of the components having a boiling point of, for example, about 538° C. and higher. The "feedstock" (also called a "feed") generally comprises at least about 2 wt. % of sulfur and at least about 1 wt. % of MCR (micro carbon residue). The sulfur content of the feedstock may be above 3 wt. %. Its MCR content may be above 2 wt. %. The feedstock may contain contaminant metals, such as nickel and vanadium. If metals are present in the feedstock, they are typically, present in an amount of at least about 20 wt. ppm, calculated on the total of Ni and V, more particularly in an amount of at least about 30 wt. ppm. MCR can be measured in accordance with ASTM D4530-03.

The apparatus used for hydroprocessing can be a reactor provided with a fixed bed, a moving bed, a fluidizing bed or an ebullated bed. Since it is desirable to keep the reaction temperature uniform, it is preferable to hydroprocess in an ebullated bed.

In an embodiment, the invention relates to a hydroprocessing method implemented by a reaction apparatus having a first reaction zone and a second reaction zone. The first reaction zone and the second reaction zone in the reaction apparatus can be provided in a single reactor, or can be provided by coupling two or more reactors with Catalyst (1) and Catalyst (2) in separate reactors. When the first and second reaction zones are provided in one reactor, a boundary between the zones may be needed. In order to remove suspended substances in feedstock, it may be desirable to use one or more additional hydroprocessing catalysts having shapes and sizes different from Catalyst (1) or Catalyst (2) upstream of the first reaction zone. When used, this additional catalyst would be present in an amount of about 10 vol. % or less, based on the total amount of Catalyst (1) and Catalyst (2).

A preferred volumetric ratio of Catalyst (1) and Catalyst (2) in the process is about 10 to 90:about 90 to 10, preferably about 30 to 70:about 70 to 30, and more preferably about 40 to 60:about 60 to 40.

In the hydroprocessing of a hydrocarbon oil, Catalyst (1) and Catalyst (2) can be used in the reactors as oxides; however, it is preferable to conduct preliminary sulfurization, in advance, using sulfur containing hydrocarbon oil, organic sulfides, organic polysulfides, carbon disulfides, hydrogen sulfides, and the like in the presence of hydrogen. The preliminary sulfurizing method can be conducted in the reactor where hydroprocessing is to be performed (in situ), or it can be conducted outside the reactor (ex situ).

In an embodiment, the invention relates to a process carried out at a liquid hourly space velocity (LHSV) of about 0.1 to about 3 hr$^{-1}$, preferably about 0.3 to 2.0 hr$^{-1}$, with hydrogen at a flow rate ratio of hydrogen to the hydrocarbon oil ($H_2$/Oil) of about 300 to about 1500 NL/L, preferably about 600 to about 1000 NL/L, with a reaction at a pressure of about 5 to about 25 MPa, preferably about 14 to about 19 MPa, and at a temperature of about 350 to about 450° C., preferably about 400 to about 440° C.

EXAMPLES

Selected embodiments of the invention are described below in non-limiting examples.

Example 1

Production of Catalyst A (Corresponding to "Catalyst (1)")

Production of Carrier

A sodium aluminate solution and an aluminum sulfate solution were simultaneously added dropwise into a tank containing tap water, for mixing. During mixing, the pH was kept at 8.5 and the temperature was kept at 77° C. The retention time was 70 minutes. The addition and mixing produced an alumina hydrate gel.

The alumina hydrate gel obtained in the above step was separated from the solution, and washed with hot water, to remove the impurities in the gel.

Following washing, the gel was kneaded using a kneading machine for about 20 minutes, to improve the moldability of the gel, and then extruded using an extruding machine into cylindrical grains having a diameter of 0.9 to 1 mm and a length of 3.5 mm.

Finally, the extruded alumina gel was dried at 120° C. for 16 hours in the presence of air, and calcined at 800° C. for 2 hours, to obtain an alumina carrier.

Production of Catalyst A 100 ml of a citric acid solution containing 17.5 g of ammonium molybdate tetrahydrate and 9.8 g of nickel nitrate hexahydrate was impregnated into one hundred grams of an aluminum carrier obtained in the above step at 25° C. for 45 minutes, to obtain a carrier loaded with metal components.

Following impregnation, the loaded carrier was dried at 120° C. for 30 minutes using a drier, and calcined in a kiln at 620° C. for 1.5 hours, to complete a catalyst.

The amounts of the respective components and the properties of the produced Catalyst A were as shown in Table 1.

Example 2

Production of Catalyst B (Corresponding to "Catalyst (2)")

Production of Carrier

An aqueous solution of sodium hydroxide was added to a tank containing tap water to adjust pH to 13. Aluminum sulfate solution was added dropwise to the tank, and the aforementioned heated aqueous solution of sodium hydroxide prepared in advance was added for mixing. The obtained aqueous solution was further mixed with aqueous solution of sodium hydroxide at pH of 9.5 at a temperature of 55° C. and held for 30 minutes. Such addition and mixing produced alumina hydrate gel.

An aqueous solution of sodium silicate was added to an aqueous solution containing the aforementioned alumina hydrate gel using nitric acid or sodium hydroxide as required, holding pH at 9.0. After separating the silica-alumina hydrate gel from the solution, washing was performed using an aqueous solution of ammonium carbonate so as to make a remaining amount of Na in filtrate 5 ppm or less to remove impurities in the gel.

The gel was then kneaded using a kneading machine for about 20 minutes, to improve the moldability of the gel, and then extruded using an extruding machine into cylindrical grains having a diameter of 0.9 to 1 mm and a length of 3.5 mm. Finally, the extruded silica-alumina gel was dried at 120° C. for 16 hours in the presence of air, and calcined at 900° C. for 2 hours, to obtain an alumina carrier. The silica content in the obtained carrier was 11.3 wt. %.

Production of Catalyst B 100 ml of a citric acid solution containing 20.2 g of ammonium molybdate tetrahydrate and 10.9 g of nickel nitrate hexahydrate was impregnated into one hundred grams of an aluminum carrier obtained in the above step at 25° C. for 45 minutes, to obtain a carrier loaded with metal components. The loaded carrier was then dried at 120° C. for 30 minutes using a drier, and calcined in a kiln at 600° C. for 1.5 hours, to complete a catalyst. The amounts of the respective components and the properties of the produced Catalyst B were as shown in Table 1.

Example 3

Production of Catalyst C (Corresponding to Said "Catalyst (2)")

Production of Carrier

An aqueous solution of sodium hydroxide was added to a tank containing tap water to adjust pH to 13. Aluminum sulfate solution was added dropwise to the tank, and the aforementioned heated aqueous solution of sodium hydroxide (prepared in advance) was added for mixing. The aqueous solution obtained was further mixed with the aqueous solution of sodium hydroxide at pH of 9.5 at a temperature of 55° C. and held for 30 minutes. Such addition and mixing produced alumina hydrate gel.

An aqueous solution of sodium silicate was then added to an aqueous solution containing the alumina hydrate gel using nitric acid or sodium hydroxide as required, holding pH at 9.0. After separating the silica-alumina hydrate gel obtained in the aforementioned process from the solution, washing was performed using an aqueous solution of ammonium carbonate so as to make a remaining amount of Na in filtrate 5 ppm or less to remove impurities in the gel.

The gel was then kneaded using a kneading machine for about 20 minutes, to improve the moldability of the gel, which was then extruded using an extruding machine into cylindrical grains having a diameter of 0.9 to 1 mm and a length of 3.5 mm. Finally, the extruded silica-alumina gel was dried at 120° C. for 16 hours in the presence of air, and calcined at 900° C. for 2 hours, to obtain an alumina carrier. The silica content in the obtained carrier was 11.3 wt. %.

Production of Catalyst C 100 ml of a citric acid solution containing 12.6 g of ammonium molybdate tetrahydrate, 8.7 g of nickel nitrate hexahydrate was impregnated into one hundred grams of the silica-alumina carrier obtained above at 25° C. for 45 minutes, to obtain a carrier loaded with metal components. The loaded carrier was dried at 120° C. for 30 minutes using a drier and calcined in a kiln at 600° C. for 1.5 hours, to complete a catalyst. The amounts of the respective components and the properties of the Catalyst C were as shown in Table 1.

Example 4

Production of Catalyst D

Production of Carrier

A sodium aluminate solution was placed in a tank containing tap water, and an aluminum sulfate solution was added for mixing, to achieve a pH of 8.5 when the addition of the aluminum sulfate solution was completed. The temperature during mixing was 64° C., and the retention time was 1.5 hours. The addition and mixing generated an alumina hydrate gel. Water glass (sodium silicate) as a silica source was then mixed. The water glass had been placed in said tank together with the aluminum sulfate solution. In this case, the sodium silicate concentration in the alumina gel aqueous solution was set at 1.6 wt. %. The silica-alumina hydrate gel was separated from the solution, and washed with hot water, to remove the impurities in the gel. The gel was then kneaded using a kneading machine for about 1 hour, to improve the moldability of the gel, and then extruded using an extruding machine into cylindrical grains having a diameter of 0.9 to 1 mm and a length of 3.5 mm. Finally, the extruded silica-alumina gel was dried at 120° C. for 16 hours in the presence of air, and calcined at 800° C. for 2 hours, to obtain a silica-alumina carrier. The silica content in the obtained carrier was 7 wt. %.

Production of Catalyst D

A solution obtained by adding 50 ml of 25% ammonia water to 16.4 g of ammonium molybdate tetrahydrate and 9.8 g of nickel nitrate hexahydrate was impregnated into one hundred grams of the silica-alumina carrier obtained above at 25° C. for 45 minutes, to obtain a carrier loaded with metal components. The loaded carrier was dried at 120° C. for 30 minutes using a drier and calcined in a kiln at 540° C. for 1.5 hours to complete a catalyst. The amounts of the respective components and the properties of the Catalyst D were as shown in Table 1.

Example 5

Production of Catalyst E

Production of Carrier

An aluminum sulfate solution and a sodium aluminate solution were simultaneously added dropwise to a tank containing tap water, for mixing. The mixing temperature was 70° C., and the pH during the dropwise addition was 7.5. Sodium aluminate was added further until a final pH of 9.5 was reached. The retention time was 70 minutes. The resulting alumina gel was extruded and calcined as described for the carrier production method of Catalyst D, to obtain alumina grains.

Production of Catalyst E 100 ml of a citric acid solution containing 17.2 g of ammonium molybdate tetrahydrate, 9.8 g of nickel nitrate hexahydrate was impregnated into one hundred grams of the silica-alumina carrier obtained above at 25° C. for 45 minutes, to obtain a carrier loaded with metal components. The loaded carrier was dried and calcined as described for the catalyst production method of Catalyst D, to obtain a metal component loaded carrier. The amounts of the respective components and the properties of the Catalyst E were as shown in Table 1.

Example 6

Production of Catalyst F

Production of Carrier

A carrier with large pores was produced according to the following method.

The carrier obtained for Catalyst C was ground and kneaded with the alumina gel of the Catalyst C again, and the mixture was extruded and calcined as described for the carrier production method of Catalyst D, to obtain a catalyst carrier having a desired pore size distribution.

Production of Catalyst F 100 ml of a citric acid aqueous-solution containing 17.2 g of ammonium molybdate tetrahydrate and 9.5 g of nickel nitrate hexahydrate was impregnated into one hundred grams of the alumina carrier at 25° C. for 45 minutes, and it was dried and calcined as described for the production method of Catalyst D, to obtain a metal component loaded carrier. The amounts of the respective components and the properties of Catalyst F were as shown in Table 1.

TABLE 1

Quantities of Respective Components and Properties of Obtained Catalysts

| | Unit | Catalyst A | Catalyst B | Catalyst C | Catalyst D | Catalyst E | Catalyst F |
|---|---|---|---|---|---|---|---|
| Components | | | | | | | |
| Catalyst components | | | | | | | |
| Molybdenum oxide | wt % | 13.2 | 15.1 | 10.0 | 11.5 | 13.3 | 13.0 |
| Nickel oxide | wt % | 2.0 | 2.8 | 2.0 | 2.1 | 2.1 | 2.2 |
| Carrier Components | | | | | | | |
| Alumina | wt % | Balance | Balance | Balance | Balance | Balance | Balance |
| Silica | wt % | N.A. | 9.6 | 10.6 | 6.1 | N.A. | N.A. |
| Specific surface area | m$^2$/g | 161 | 266 | 270 | 214 | 168 | 125 |
| Total pore volume | ml/g | 0.88 | 0.81 | 0.82 | 0.75 | 0.72 | 0.80 |
| Rate of the volume of the pores having diameters of 40 to 200 Å | % | 37 | 43 | 49 | 75 | 65 | 52 |
| Rate of the volume of the pores having diameters of 200 Å & more | % | 63 | 57 | 51 | 25 | 35 | 48 |
| Rate of the volume of the pores having diameters of 1000 Å & more | % | 33 | 9 | 9 | 10 | 16 | 29 |
| Rate of the volume of the pores having diameters of 2000 Å & more | % | 24 | 0 | 0 | 1 | 12 | 21 |

TABLE 1-continued

Quantities of Respective Components and Properties of Obtained Catalysts

| | Unit | Catalyst A | Catalyst B | Catalyst C | Catalyst D | Catalyst E | Catalyst F |
|---|---|---|---|---|---|---|---|
| Rate of the volume of the pores having diameters of 4000 Å & more | % | 16 | 0 | 0 | 0.3 | 2 | 18 |
| Rate of the volume of the pores having diameters of 10000 Å & more | % | 0.1 | 0 | 0 | 0 | 0.5 | 3.5 |
| Rate of the volume of the pores having diameters of 100 Å & less | % | 0.4 | 39 | 37 | 14 | 0.4 | 0.6 |
| Rate of the volume of the pores having diameters of 100 to 1200 Å | % | 74 | 53 | 56 | 73 | 68 | 55 |
| Rate of the volume of the pores having diameters of 200 to 1000 Å | % | 30 | 32 | 42 | 15 | 19 | 19 |
| Rate of the volume ($1^{st}$ peak of pore diameter ± 20 Å) ÷ (pores of 40 to 200 Å) | % | 52 | 52 | 54 | 39 | 37 | — |
| Pore diameter of $1^{st}$ peak | Å | — | 70 | 75 | 125 | 130 | 150 |
| Pore diameter of 2nd peak | Å | — | 700 | 700 | 1100 | 1500 | 3100 |
| Mean pore diameter | Å | — | 135 | 133 | 125 | 200 | 230 |

N.A.: Not available

Example 7

Hydroprocessing

Table 2 shows the properties of the feedstock used. The feedstock contained about 93 wt. % of components having boiling points of higher than 538° C., about 4.9 wt. % of sulfur, about 3300 wt. ppm of total nitrogen, 109 wt. ppm of vanadium, 46 wt. ppm of nickel, and about 8 wt. % of asphaltene as normal heptane insoluble matter, all based on the total weight of the feedstock.

TABLE 2

Composition of Feedstock
Middle East vacuum residue/atmospheric residue (VR:AR = 90:10)

| Sulfur (wt. %) | 4.912 |
|---|---|
| Nitrogen (wt. ppm) | 3300 |
| Metal (wt. ppm) | |
| Vanadium | 109 |
| Nickel | 46 |
| Micro Carbon Residue (wt. %) | 22.5 |
| $C_7$-insoluble*[1] (wt. %) | 8.0 |

TABLE 2-continued

Composition of Feedstock
Middle East vacuum residue/atmospheric residue (VR:AR = 90:10)

| Vacuum residue fractions*[2],*[3] (wt. %) | 93 |
|---|---|
| Density (g/ml; 15° C.) | 1.0298 |

*[1] Matter insoluble in normal heptane.
*[2] Vacuum residue fractions having boiling points of 538° C. and higher.
*[3] Measured according to distillation gas chromatography (ASTM D 5307).

Reactors were loaded with Catalysts A, B, C, D, E and F in the combinations shown in Table 3 for hydroprocessing.

The feedstock with the properties stated in Table 2 in the liquid phase at 16.0 MPa was added to extra-heavy oil in the 415° C. acceleration condition and kept at a temperature of 410° C. Then hydrogen was introduced at a ratio of supplied hydrogen to the feedstock ($H_2$/Oil) of 688 NL/L to obtain an oil product.

The oil product was collected and analyzed to obtain VR conversion (cracking rate), TLP (total liquid product), an amount of sediment generation, sulfur concentration, and an amount of MCR (micro carbon residue). The results are shown in Table 3.

TABLE 3

Catalyst Combinations Evaluated

| | Example 1 | Example 2 | Comparative Example 1 | Comparative Example 2 | Comparative Example 3 | Comparative Example 4 | Comparative Example 5 | Comparative Example 6 |
|---|---|---|---|---|---|---|---|---|
| Catalyst packed into the first step | Catalyst A | Catalyst A | Catalyst A | Catalyst A | Catalyst A | Catalyst A | Catalyst D | Catalyst D |
| Catalyst packed into the second step | Catalyst B | Catalyst C | Catalyst D | Catalyst E | Catalyst F | Catalyst A | Catalyst E | Catalyst F |
| VR conversion (%) of product on the sixth evaluation day | 57.0 | 60.3 | 57.1 | 58.2 | 56.3 | 55.4 | 57.3 | 60.1 |
| Existent sediment IP-375 (wt. %) of TLP product on the sixth evaluation day | 0.16 | 0.17 | 0.18 | 0.22 | 0.17 | 0.15 | 0.20 | 0.35 |
| Existent sediment IP-390A (wt. %) of TLP product on the sixth evaluation day | 0.48 | 0.59 | 0.60 | 0.83 | 0.72 | 0.65 | 0.74 | 0.92 |
| Existent sediment IP-375 (wt. %) of 343C + product on the sixth evaluation day | 0.06 | 0.08 | 0.08 | 0.09 | 0.06 | 0.05 | 0.08 | 0.09 |
| Existent sediment IP-390A (wt. %) of 343C + product on the sixth evaluation day | 0.69 | 0.78 | 0.79 | 1.12 | 0.96 | 0.67 | 0.88 | 1.26 |

TABLE 3-continued

| Catalyst Combinations Evaluated | | | | | | | | |
|---|---|---|---|---|---|---|---|---|
| | Example 1 | Example 2 | Comparative Example 1 | Comparative Example 2 | Comparative Example 3 | Comparative Example 4 | Comparative Example 5 | Comparative Example 6 |
| Sulfur content (wt. %) of TLP product on the sixth evaluation day | 0.90 | 0.89 | 0.95 | 0.94 | 1.01 | 0.99 | 0.98 | 0.88 |
| MCR content (wt. %) of TLP product on the sixth evaluation day | 11.5 | 11.5 | 11.7 | 11.7 | 12.1 | 12.1 | 12.0 | 11.5 |

IP-375, IP-390A:
Sediment according to the methods described in IP-375 and IP-390A method respectively.
IP-375 and IP-390A methods refer to a sediment analyzing method (given No. 375 and No. 390A) among the analyzing methods established by the British Institute of Petroleum "Institute of Petroleum".

As can be seen from the results of Table 3 in the processing of vacuum residue fractions, it is shown that compared with the comparative examples of various catalyst combinations, Examples 1 and 2 can maintain high MCR removal and also achieve high demetallization and high cracking rate, while decreasing sediment formation.

The invention claimed is:

1. A method of hydroprocessing a heavy hydrocarbon oil, comprising:
   (a) contacting in a first hydroprocessing step the heavy hydrocarbon oil with hydrogen in the presence of a catalytically effective amount of a first catalyst having activity for hydrocracking asphaltenes in the heavy hydrocarbon oil in order to produce a hydroprocessed heavy hydrocarbon oil having fewer asphaltenes than the heavy hydrocarbon feed, and
   (b) contacting the hydroprocessed heavy hydrocarbon oil with hydrogen in the presence of a second, independently selected catalyst having activity for hydrodesulfurizing the hydroprocessed heavy hydrocarbon feed; wherein
      (i) the second catalyst is a supported catalyst, with the support containing about 2 wt. % to about 40 wt. % silica based on the total weight of the support,
      (ii) the second catalyst is characterized by a pore size distribution having a first peak with a peak position in the range of about 40 Å diameter to about 200 Å diameter, with the first peak representing pores that together contain about 35% to about 90% of the total pore volume of the catalyst, and
      (iii) the pores of the first peak within a diameter range of about ±20 Å from the peak position contain at least about 50% of the pore volume in the diameter range of about 40 to about 200 Å.

2. The method of claim 1, wherein the first catalyst comprises a porous inorganic carrier loaded with about 7 to about 20 wt. % of the oxide of at least one Group VI(b) metal of the Periodic Table and about 0.5 to about 6 wt. % of the oxide of at least one Group VIII metal of the Periodic Table; the weight percents being based on the weight of the catalyst.

3. The method of claim 2 wherein the first catalyst is characterized by (a) a specific surface area of about 100 to about 180 m²/g, and (b) a total pore volume of at least about 0.55 ml/g.

4. The method of claim 2 wherein the first catalyst is characterized by a pore size distribution wherein the proportion of the volume of the pores having diameters of at least about 200 Å is at least about 50%, based on the total pore volume, and wherein the proportion of the volume of the pores having diameters of at least about 2000 Å ranges from about 10% to about 30%, based on the total pore volume.

5. The method of claim 1 wherein the second catalyst comprises about 5 to about 30 wt. % of an oxide of at least one Group VI(b) metal of the Periodic Table and about 0.5 to about 30 wt. % of an oxide of at least one Group VIII metal of the Periodic Table, the weight percents of the Group VI(b) and Group VIII metal oxides being based on the weight of the catalyst.

6. The method of claim 5 wherein the second catalyst is characterized by a specific surface area of about 150 to about 400 m²/g, and a total pore volume of about 0.3 to about 1.2 ml/g.

7. The method of claim 5, wherein the second catalyst is characterized by a pore size distribution having:
   a second peak representing pores in a range of about 200 Å diameter to about 2000 Å diameter;
   pores having a diameter in the range of about 200 Å to about 1000 Å, wherein the pores having a diameter in the range of about 200 Å to about 1000 Å contain about 10% to about 60% of the total pore volume of the catalyst; and
   wherein the pores having a diameter of at least 1000 Å contain about 20% or less of the total pore volume of the catalyst, and wherein the catalyst has a mean pore diameter in the range of about 70 to about 180 Å.

8. The method of claim 1, wherein the hydroprocessing is carried out at a temperature of about 350 to about 450° C. and a pressure of about 5 to about 25 MPa in the first and second reaction zones.

9. The method of claim 1, wherein the heavy hydrocarbon oil disposed as an ebullated bed is brought into contact with the hydroprocessing catalyst.

10. The method of claim 1, wherein the feedstock is an atmospheric residue containing about 30 wt. % or more of components boiling above 538° C.

11. The method of claim 1, wherein the feedstock is a vacuum residue containing about 60 wt. % or more of components boiling above 538° C.

* * * * *